United States Patent
Schmidt

(10) Patent No.: US 10,766,464 B2
(45) Date of Patent: Sep. 8, 2020

(54) SENSOR CLEANING AND THERMAL CONTROL

(71) Applicant: Ford Global Technologies, LLC, Dearborn, MI (US)

(72) Inventor: David J. Schmidt, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 248 days.

(21) Appl. No.: 15/916,932

(22) Filed: Mar. 9, 2018

(65) Prior Publication Data

US 2019/0275991 A1    Sep. 12, 2019

(51) Int. Cl.
| | |
|---|---|
| *B60S 1/54* | (2006.01) |
| *B60S 1/56* | (2006.01) |
| *B60S 1/62* | (2006.01) |
| *G02B 27/00* | (2006.01) |
| *B08B 5/02* | (2006.01) |
| *B08B 3/02* | (2006.01) |

(52) U.S. Cl.
CPC ...... *B60S 1/62* (2013.01); *B08B 3/02* (2013.01); *B08B 5/02* (2013.01); *G02B 27/0006* (2013.01)

(58) Field of Classification Search
CPC ........ B60S 1/56; B60S 1/62; B60R 2300/102; B60R 1/0602; B08B 3/02; B08B 5/02; G01N 2021/945; G01N 21/15; G01N 21/94; G02B 27/0006
See application file for complete search history.

(56) References Cited

U.S. PATENT DOCUMENTS

| | | | |
|---|---|---|---|
| 5,394,208 A | 2/1995 | Campbell | |
| 5,950,436 A | 9/1999 | Tunkel et al. | |
| 2001/0054655 A1* | 12/2001 | Berg | B60S 1/481 |
| | | | 239/284.1 |
| 2002/0137455 A1* | 9/2002 | Ivanov | B60S 1/245 |
| | | | 454/157 |
| 2013/0092758 A1* | 4/2013 | Tanaka | B60S 1/52 |
| | | | 239/284.1 |
| 2016/0041452 A1 | 2/2016 | Nomura et al. | |
| 2016/0207075 A1* | 7/2016 | Alexander | F16K 11/18 |
| 2016/0208955 A1* | 7/2016 | Pinto, IV | B60S 1/52 |
| 2016/0272163 A1* | 9/2016 | Dreiocker | B60S 1/56 |
| 2017/0210304 A1 | 7/2017 | Davies et al. | |
| 2017/0261273 A1 | 9/2017 | Maranville et al. | |
| 2018/0015907 A1* | 1/2018 | Rice | B60S 1/56 |
| 2018/0221921 A1* | 8/2018 | Magee | H01L 41/042 |
| 2018/0222450 A1* | 8/2018 | Kunze | B60S 1/56 |
| 2019/0193688 A1* | 6/2019 | Lombrozo | B08B 5/02 |

FOREIGN PATENT DOCUMENTS

| | | |
|---|---|---|
| DE | 102016015317 A1 | 7/2017 |
| EP | 2605043 B1 | 7/2014 |
| WO | WO-2005125295 A2 * 12/2005 | ............. F02M 26/28 |

* cited by examiner

*Primary Examiner* — Joseph L. Perrin
*Assistant Examiner* — Irina Graf
(74) *Attorney, Agent, or Firm* — Frank A. MacKenzie; Bejin Bieneman PLC

(57) ABSTRACT

An assembly includes a sensor defining a field of view. The assembly includes a diverter valve having an input port, a first output port, and a second output port. The assembly includes a fluid nozzle in fluid communication with the first output port and facing the field of view. The assembly includes a cooler in fluid communication with the second output port.

18 Claims, 5 Drawing Sheets

SENSOR CLEANING AND THERMAL CONTROL

BACKGROUND

A vehicle may include one or more object detection sensors such as Light Detection and Ranging (LIDAR) sensors, cameras, etc., to detect objects, e.g., in an area outside the vehicle. A sensor for detecting objects outside a vehicle may be mounted to a vehicle exterior. For example, a sensor may be mounted to a vehicle roof, pillar, etc. Operation of such sensors may be enhanced by controlling a temperature of the sensors, and maintaining an uncontaminated field of view for the sensors.

DETAILED DESCRIPTION

Figure 1:
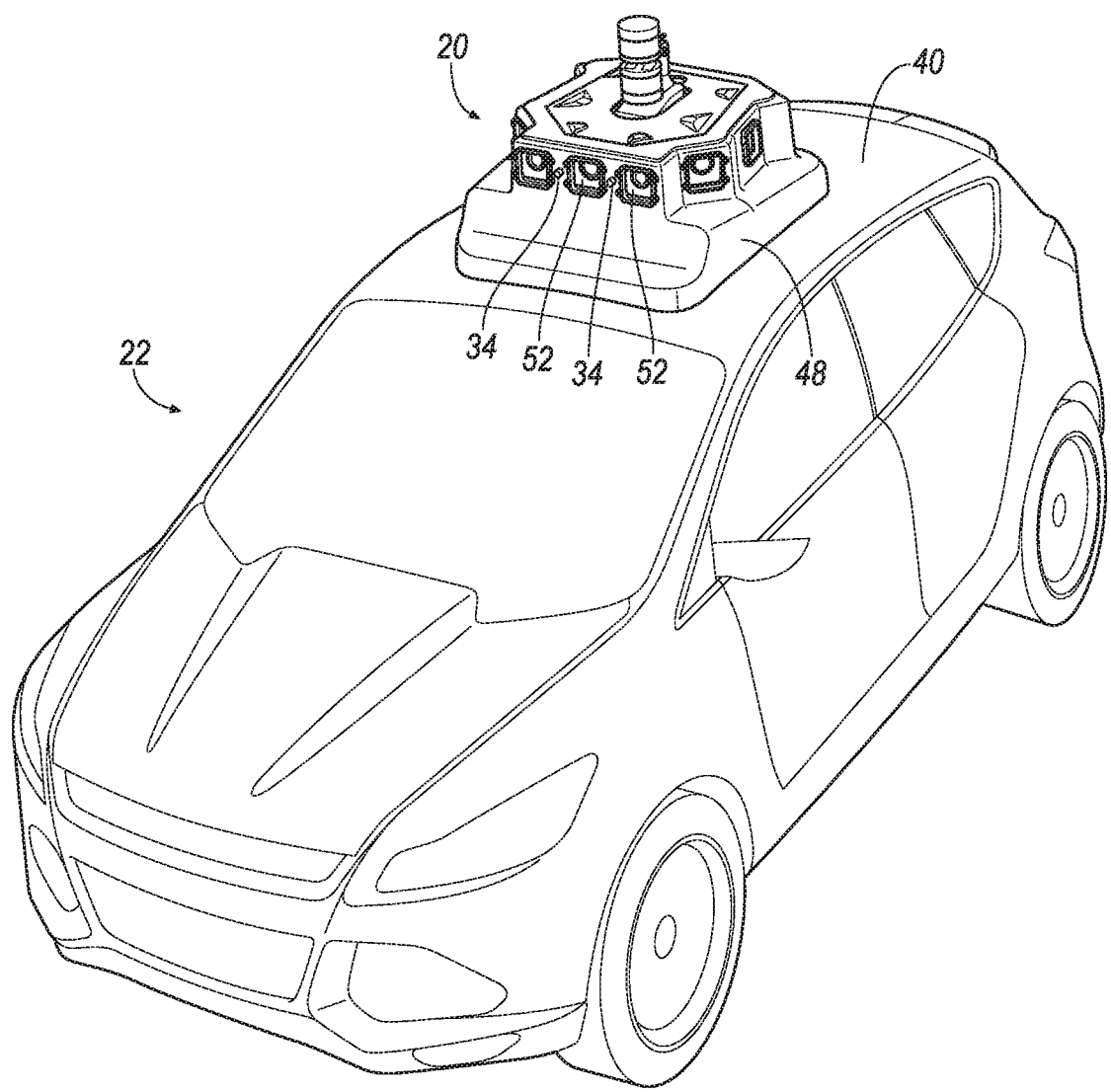
FIG. 1 is a perspective view of a vehicle with a sensor assembly.
Figure 2:
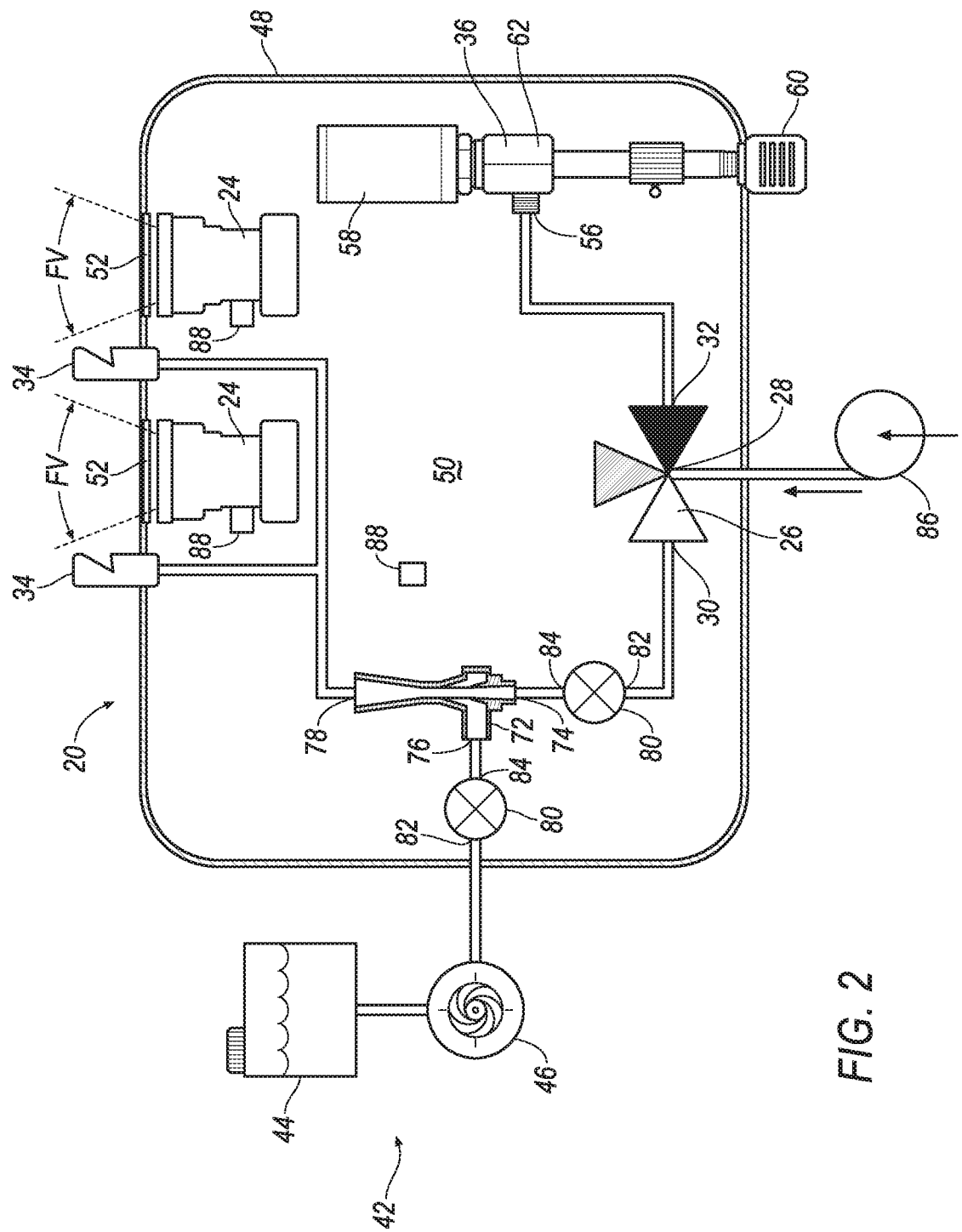
FIG. 2 is a schematic of the sensor assembly.

An assembly includes a sensor defining a field of view. The assembly includes a diverter valve having an input port, a first output port, and a second output port. The assembly includes a fluid nozzle in fluid communication with the first output port and facing the field of view. The assembly includes a cooler in fluid communication with the second output port.

The assembly may include an air compressor in fluid communication with the input port.

The diverter valve may be movable to a first position where fluid is inhibited from flowing from the input port to the first output port and permitted to flow from the input port to the second output port, and to a second position where fluid is inhibited from flowing from the input port to the second output port and permitted to flow from the input port to the first output port.

The assembly may include a processor and a memory storing program instructions executable by the processor to actuate the diverter valve to the second position in response to determining that the field of view is contaminated.

The assembly may include a processor and a memory storing program instructions executable by the processor to actuate the diverter valve to the first position in response to detecting that a temperature of the sensor is above a threshold.

The diverter valve may be movable to a third position where fluid is permitted to flow from the input port to the first output port and the second output port.

The assembly may include a processor and a memory storing program instructions executable by the processor to actuate the diverter valve to the third position in response to detecting that a temperature of the sensor is above a first threshold, and to actuate the diverter valve to the first position in response to detecting that the temperature of the sensor is above a second threshold that is higher than the first threshold.

The assembly may include a washer fluid system in fluid communication with the fluid nozzle.

The assembly may include a processor and a memory storing program instructions executable by the processor to actuate the washer fluid system to provide fluid to the fluid nozzle in response to determining that the field of view is contaminated.

The assembly may include a mixer valve having a first input port in fluid communication with the first output port of the diverter valve, a second input port in fluid communication with the washer fluid system, and an output port in fluid communication with the fluid nozzle.

The assembly may include a shutoff valve having a first port in fluid communication with the first output port of the diverter valve and a second port in fluid communion with the first input port of the mixer valve.

The assembly may include a shutoff valve having a first port in fluid communication with the washer fluid system and a second port in fluid communion with the second input port of the mixer valve.

The washer fluid system may include a reservoir and a pump.

The assembly may include a housing, and the sensor may be in the housing.

The housing may define a chamber, and the cooler may include a cold air exhaust in fluid communication with the chamber and a hot air exhaust free from being in fluid communication with the chamber.

The cooler may be in the housing.

The cooler may include a vortex tube.

The assembly may include a processor and a memory storing program instructions executable by the processor to stop a vehicle in response detecting that a temperature of the sensor is above a threshold and determining that the field of view is contaminated.

The assembly may include a lens in the field of view of the sensor, the fluid nozzle facing the lens.

The assembly may include a second lens and a second fluid nozzle in fluid communication with the first output port of the diverter valve and facing the second lens.

With reference to the Figures, wherein like numerals indicate like parts throughout the several views, a sensor assembly 20 for a vehicle 22 includes a navigation sensor 24 defining a field of view FV. The sensor assembly 20 includes a diverter valve 26 having an input port 28, a first output port 30, and a second output port 32. The sensor assembly 20 includes a fluid nozzle 34 in fluid communication with the first output port 30 and facing the field of view FV. The sensor assembly 20 includes a cooler 36 in fluid communication with the second output port 32.

The arrangement of the diverter valve 26, the fluid nozzle 34, and the cooler 36 enable the sensor assembly 20 to control a temperature of the navigation sensor 24 and to maintain an uncontaminated field of view FV of the navigation sensor 24.

The vehicle 22 may be any passenger or commercial automobile such as a car, a truck, a sport utility vehicle, a crossover vehicle, a van, a minivan, a taxi, a bus, etc.

A computer 38 may operate the vehicle 22 in an autonomous mode, a semi-autonomous mode, or a non-autonomous mode. For purposes of this disclosure, an autonomous mode is defined as one in which each of vehicle propulsion components 39, braking components 41, and steering components 43 are controlled by the computer 38; in a semi-autonomous mode the computer 38 controls one or two of vehicle propulsion components 39, braking components 41, and steering components 43; in a non-autonomous mode, a human operator controls the vehicle propulsion components 39, braking components 41, and steering components 43.

The vehicle 22 may include a roof 40. The roof 40 provides cover and protection to occupants of the vehicle 22. The roof 40 may include an internal panel, an exterior panel, and a headliner. The internal panel provides support to the exterior panel, the headliner, etc. The internal panel may be steel, aluminum, carbon fiber, or any other suitable material. The headliner and the exterior panel provide class-A surfaces to the roof 40, i.e., surfaces specifically manufactured to have a high-quality, finished aesthetic appearance free of blemishes, etc.

The vehicle 22 may include a washer fluid system 42. The washer fluid system 42 includes components for delivering fluid to various surfaces of the vehicle 22, e.g., to a surface of a windshield. The washer fluid system 42 may include a fluid reservoir 44 and a fluid pump 46. The washer fluid system 42 may be in fluid communication with one or more of the fluid nozzles 34, e.g., via tubing, etc. For example, the fluid reservoir 44 and the fluid pump 46 may be in fluid communication with the fluid nozzles 34 such that the washer fluid system 42 may actuate the fluid pump 46 to move fluid from the fluid reservoir 44 to the fluid nozzles 34, e.g., in response to receiving an instruction from the computer 38. The washer fluid system 42 may be supported in an engine bay of the vehicle 22, or at any other location of the vehicle 22.

The sensor assembly 20 collects data with one or more navigation sensors 24. Data from the navigation sensors 24 is used by the computer 38 to operate the vehicle 22 in the autonomous mode and the semi-autonomous mode. The sensor assembly 20 may be supported by the roof 40 of the vehicle 22, or at any other location of the vehicle 22.

The sensor assembly 20 may include a housing 48. The housing 48 defines a chamber 50. The housing 48 encloses and protects other components of the sensor assembly 20, e.g., the navigation sensors 24, within the chamber 50. The housing 48 may be a rigid plastic, or any other suitable material.

The navigation sensors 24 may detect the external world, for example, the navigation sensors 24 may be radar sensors, scanning laser range finders, light detection and ranging (LIDAR) devices, image processing sensors such as cameras, etc. Each navigation sensor 24 may define a field of view FV, i.e., a range of directions relative to the navigation sensor 24 from which light may be detected. One or more navigation sensors 24 may be in the housing 48, e.g., supported within the chamber 50.

The sensor assembly 20 may include one or more lenses 52. The lenses 52 may be in the fields of view FV of the navigation sensors 24. To put it another way, the navigation sensors 24 may be supported in the chamber 50 such that the fields of view FV are directed through the lenses 52. The lenses 52 protect the navigation sensors 24. For example, each lens 52 may be positioned to cover an opening in the housing 48, e.g., permitting light to pass therethrough, and inhibiting contaminants, such as dirt, water, etc., from entering the chamber 50.

As set forth above, the diverter valve 26 has the input port 28, the first output port 30, and the second output port 32. The diverter valve 26 receives fluid via the input port 28 and selectively provides fluid to the first output port 30 and/or the second output port 32. For example, the fluid may be air received from an air compressor 86 of the vehicle 22 and/or sensor assembly 20 (discussed below). The diverter valve 26 is movable to a first position where fluid is inhibited from flowing from the input port 28 to the first output port 30 and permitted to flow from the input port 28 to the second output port 32. The diverter valve 26 is movable to a second position where fluid is inhibited from flowing from the input port 28 to the second output port 32 and permitted to flow from the input port 28 to the first output port 30. The diverter valve 26 may be movable to one or more third positions where fluid is permitted to flow from the input port 28 to the first output port 30 and the second output port 32. The third positions may progressively transition between the first position and the second position, e.g., such that varying amounts of the fluid from the input port 28 is apportioned to the first output port 30 and the second output port 32, e.g., such that a 60/40 split, a 20/80 split, etc., of fluid may be achieved. The diverter valve 26 may be movable to an off position where fluid is inhibited from flowing from the input port 28 to the first output port 30 and the second output port 32. For example, the diverter valve 26 may be a plug diverter, a tube diverter, a ball diverter, etc. The diverter valve 26 may include an actuator, e.g., a hydraulic actuator, an electromagnetic actuator, an electromechanical actuator, a mechanical actuator, etc., that moves the diverter valve 26 between the first position, the second position, the third positions, and/or the off position, e.g., in response to an instruction from the computer 38.

The sensor assembly 20 includes one or more fluid nozzles 34. The fluid nozzles 34 maintain clarity of the fields of view FV of the navigation sensors 24. The fluid nozzles 34 face the fields of view FV. To put it another way, fluid exiting the fluid nozzles 34 may travel across the fields of view FV, e.g., creating air curtains that move contaminants, e.g., dirt, water, etc., away from the fields of view FV. The fluid nozzles 34 may face the lenses 52. To put it another way, fluid exiting the fluid nozzles 34 may travel across the lenses 52, e.g., creating air curtains in front of the lenses 52, and/or fluid may contact the lenses 52, e.g., to remove contaminants from the lenses 52.

The fluid nozzles 34 are in fluid communication with the first output port 30 of the diverter valve 26, e.g., via tubing, etc. To put it another way, the fluid nozzles 34 may receive fluid from the first output port 30 of the diverter valve 26.

The cooler 36 provides cooled fluid to reduce a temperature of the sensor assembly 20, e.g., a temperature of one or more of the navigation sensors 24, a temperature of air in the chamber 50, etc. The cooler 36 may be in the housing 48, e.g., supported in the chamber 50. The cooler 36 may include an air input 56, a cold air exhaust 58 and a hot air exhaust 60. The cooler 36 may receive air at the air input 56 and split such air between the cold air exhaust 58 and the hot air exhaust 60. The cooler 36 is in fluid communication with the second output port 32. To put it another way, the air input 56 of the cooler 36 may receive fluid from the second output port 32 of the diverter valve 26, e.g., via tubing, etc. The cold air exhaust 58 may be in fluid communication with the chamber 50. For example, the cold air exhaust 58 may exhaust air directly into the chamber 50, indirectly via tubing, etc. The hot air exhaust 60 may be free from being in fluid communication with the chamber 50. For example, the hot air exhaust 60 may be outside of the chamber 50, may exhaust air outside the chamber 50, e.g., via tubing, etc.

Figure 3:
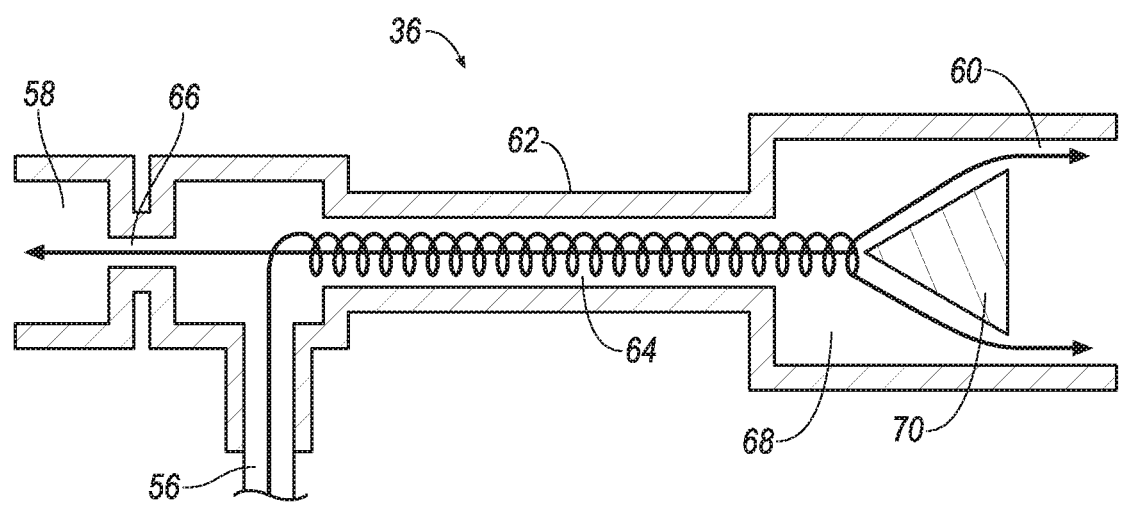
FIG. 3 is a cross section of a cooler of the sensor assembly.

The cooler 36 may include a vortex tube 62. The vortex tube 62 defines a swirl chamber 64 that extends from a first end 66 to a second end 68, as shown in FIG. 3. The first end 66 may be in fluid communication with the cold air exhaust 58. The second end 68 may be in fluid communication with the hot air exhaust 60. The air input 56 may provide air tangentially to the swirl chamber 64 between the first end 66 and the second end 68. Air swirls within the swirl chamber 64, with warmer air at a radial periphery of the swirl chamber 64 and cooler air at an axially extending centerline of the swirl chamber 64. A conical plug 70 may be positioned at the second end 68, permitting warmer air to the exit the second end 68 at the radial periphery of the swirl chamber 64. Such warmer air flows out the hot air exhaust 60. Cooler air at the center line is blocked by the conical plug 70 and exits the first end 66 of the swirl chamber 64, flowing out the cold air exhaust 58.

The sensor assembly 20 may include a mixer valve 72. The mixer valve 72 may have a first input port 74, a second input port 76, and an output port 78. Fluid may be received by the first input port 74 and the second input port 76, such fluid may be mixed within the mixer valve 72. The mixed fluid may exit the mixer valve 72 at the output port 78. The first input port 74 may be in fluid communication with the first output port 30 of the diverter valve 26, e.g., to receive fluid from the first output port 30 of the diverter valve 26. The second input port 76 may be in fluid communication with the washer fluid system 42, e.g., to receive fluid from the fluid reservoir 44, e.g., via tubing, etc. The output port 78 may be in fluid communication with one or more of the fluid nozzles 34. To put it another way, the mixer valve 72 may provide fluid to the fluid nozzles 34, e.g., via tubing, etc.

The sensor assembly 20 may include one or more shutoff valves 80. The shutoff valves 80 control the flow of fluid in the sensor assembly 20. Each shutoff valve 80 may include a first port 82 and a second port 84. Each shutoff valve 80 may move to an open position, where fluid is permitted to flow between the first port 82 and the second port 84. Each shutoff valve 80 may move to a closed position, where fluid is inhibited from flowing between the first port 82 and the second port 84. The shutoff valves 80 may include circuits, chips, actuators, etc., to move the shutoff valve 80 to the open position and to the closed position, e.g., in response to an instruction from the computer 38.

One of the shutoff valves 80 may be between the mixer valve 72 and the diverter valve 26, e.g., to inhibit fluid flow between the mixer valve 72 and the diverter valve 26 when such shutoff valve 80 is in the closed position. For example, the first port 82 of such shutoff valve 80 may be in fluid communication with the first output port 30 of the diverter valve 26 and the second port 84 may be in fluid communion with the first input port 74 of the mixer valve 72.

One of the shutoff valves 80 may be between the washer fluid system 42 and the mixer valve 72, e.g., to inhibit fluid flow between the washer fluid system 42 and the mixer valve 72 when such shutoff valve 80 is in the closed position. For example, the first port 82 of such shutoff valve 80 may be in fluid communication with the washer fluid system 42 and the second port 84 may be in fluid communion with the second input port 76 of the mixer valve 72.

As set forth above, the vehicle 22 and/or sensor assembly 20 may include the air compressor 86. The air compressor 86 provides air at an increased pressure relative to ambient air pressure. The air compressor 86 may include a motor, a piston and cylinder, an air reservoir, valves, tubing, etc. The air compressor 86 may actuate to provide air, e.g., in response to an instruction from the computer 38. The air compressor 86 may be in fluid communication with the input port 28 of the diverter valve 26, e.g., via tubing, etc. To put it another way, the air compressor 86 may provide air to the diverter valve 26.

The sensor assembly 20 may include one or more temperature sensors 88. The temperature sensors 88 may be resistance temperature detectors, thermal image cameras, etc. One or more temperature sensors 88 may be positioned to detect a temperature of air in the chamber 50, of one or more of the navigation sensors 24, ambient air outside the housing 48, etc. For example, one or more temperature sensors 88 may be supported in the chamber 50. As another example, one or more temperature sensors 88 may be thermally coupled to one of the navigation sensors 24.

The propulsion components 39 of the vehicle 22 generate energy and translates the energy into motion of the vehicle 22. The propulsion components 39 may be, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion components 39. The propulsion components 39 is in communication with and receives input from the computer 38 and from a human driver. The human driver may control the propulsion components 39 via, e.g., an accelerator pedal and/or a gear-shift lever.

The braking components 41 resist the motion of the vehicle 22 to thereby slow and/or stop the vehicle 22. The braking components 41 may be friction brakes such as disc brakes, drum brakes, band brakes, and so on; regenerative brakes; any other suitable type of brakes; or a combination. The braking component 41 are in communication with and receives input from the computer 38 and a human driver. The human driver may control the braking components 41 via, e.g., a brake pedal.

The steering components 43 control a turning angle of wheels of the vehicle 22. The steering components 43 are in communication with and receives input from a steering wheel and the computer 38. The steering components 43 may be a rack-and-pinion system with electric power-assisted steering, a steer-by-wire system, or any other suitable system.

Figure 4:
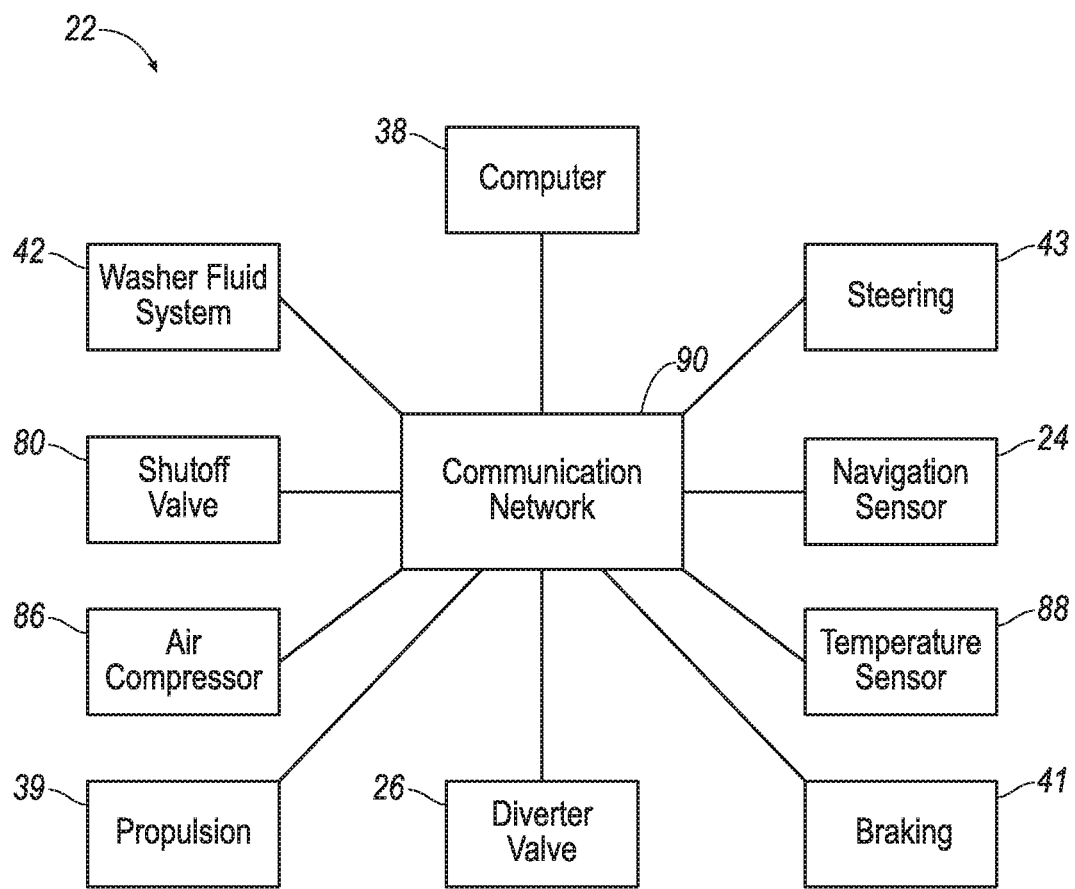
FIG. 4 is a block diagram of components of the vehicle.

The vehicle 22 and/or sensor assembly 20 may include a communication network 90, shown in FIG. 4. The communication network 90 includes hardware, such as a communication bus, for facilitating communication among vehicle 22 and/or sensor assembly 20 components, e.g., the computer 38, the navigation sensors 24, the diverter valve 26, the shutoff valves 80, the washer fluid system 42, the air compressor 86, etc. The communication network 90 may facilitate wired or wireless communication among the components in accordance with a number of communication protocols such as controller area network (CAN), Ethernet, WiFi, Local Interconnect Network (LIN), and/or other wired or wireless mechanisms.

The computer 38, implemented via circuits, chips, or other electronic components, is included for carrying out various operations, including as described herein. The computer 38 is a computing device that includes a processor and a memory, the memory including one or more forms of computer-readable media, and storing instructions executable by the processor for performing various operations, including as disclosed herein. The memory of the computer 38 further generally stores remote data received via various communications mechanisms; e.g., the computer 38 is generally configured for communications on a controller area network (CAN) bus or the like, and/or for using other wired or wireless protocols, e.g., Bluetooth, etc. The computer 38 may also have a connection to an onboard diagnostics connector (OBD-II). Via the communication network 90, e.g., using Ethernet, WiFi, the CAN bus, Local Interconnect Network (LIN), and/or other wired or wireless mechanisms, the computer 38 may transmit and/or receive messages to and/or from various component of the vehicle 22 and sensor assembly 20. Although one computer 38 is shown as a component of the vehicle 22 in FIG. 4 for ease of illustration, it is to be understood that the computer 38 could include, and various operations described herein could be carried out by, one or more computing devices of the sensor assembly 20 and/or vehicle 22.

The computer 38 may be programmed to actuate the air compressor 86, e.g., to provide air. For example, the computer 38 may transmit an instruction indicating such actuation to the air compressor 86 via the communication network 90.

The computer 38 may be programmed to actuate the diverter valve 26 to the first position, the second position, the third positions, the closed position, etc. For example, the computer 38 may transmit an instruction to the diverter valve 26 via the communication network 90. The instruction may indicate a position, e.g., one of the first position, the second position, the third positions, and the closed position.

The computer 38 may be programmed to detect a temperature of the navigation sensor 24 and/or the sensor assembly 20, e.g., based on data from the temperature sensors 88 received via the communication network 90.

The computer 38 may be programmed to determine whether one or more of the fields of view FV, e.g., whether one or more of the lenses 52 in the fields of view FV, are contaminated. The computer 38 may make such determination based on information received, e.g., via the communication network 90, from one or more of the navigation sensors 24, e.g., using image recognition processes and methods.

For example, the computer 38 may compare images, received from one of the navigation sensors 24 with each other and identify an artifact that is consistent among the images, e.g., dirt on one of the lenses 52 will appear in a consistent location on the images while a remainder of the images will change. Upon identification of a threshold amount, e.g., a number, a total area, etc., of artifacts the computer 38 may determine the lens 52 is contaminated. For example, the area of the artifacts may be compared to a threshold area, e.g., 5 percent of the field of view FV. The number of artifacts may be compared to a threshold amount, e.g., 10 artifacts. When the area and/or number of artifacts is greater than the threshold area and/or threshold amount, the computer 38 may determine the lens 52 in the field of view FV is contaminated.

For example, the computer 38 may identify data from one or more of the navigation sensors 24 as being of low quality, e.g., a low resolution resulting from contamination of one of the lenses 52 interfering with focusing light on the navigation sensor 24, inconsistent data from a LIDAR sensor indicating light is not being transmitted and/or received in certain areas of the field of view FV of the navigation sensor 24. Other techniques and processes, e.g., image recognition techniques and processes, may be used to determine whether one or more of fields of view FV are contaminated.

Figure 5:
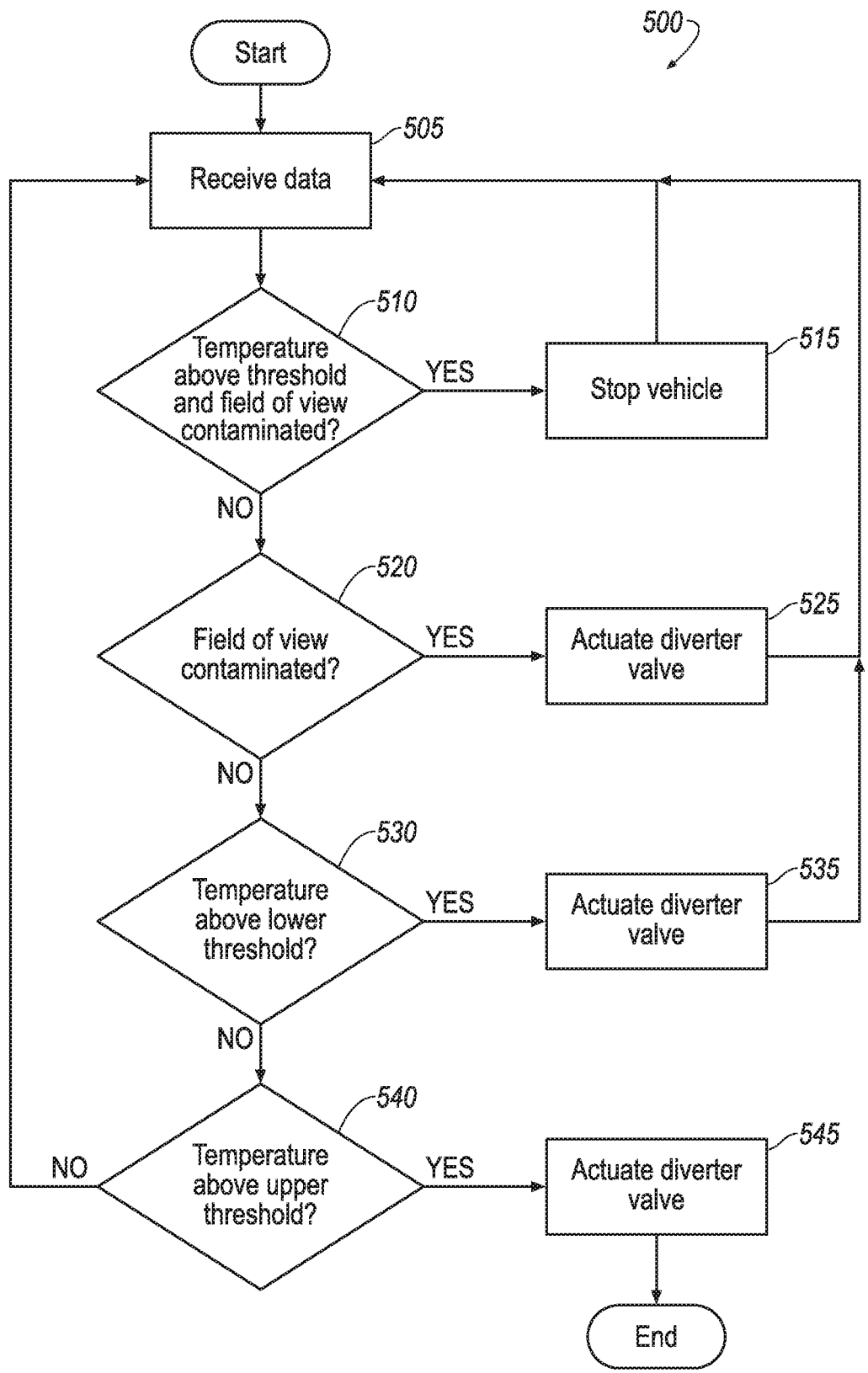
FIG. 5 is a flow chart illustrating a process for controlling the vehicle.

FIG. 5 is a process flow diagram illustrating an exemplary process 500 for controlling the sensor assembly 20 and vehicle 22.

The process 500 begins in a block 505 where the computer 38 receives data, e.g., from the navigation sensors 24, the temperature sensors 88, etc., e.g., via the communication network 90. The computer 38 may continue to receive data throughout the process 500. Throughout the process 500 in the present context means substantially continuously or at time intervals, e.g., every 100 milliseconds. The diverter valve 26 may be in the off position, one of the third positions, or any other position in the block 505.

Next, at a block 510 the computer 38 determines whether a temperature of one or more of the navigation sensors 24 is above a threshold temperature and whether one or more of the fields of view FV, e.g., one of the lenses 52 in the fields of view FV, are contaminated. The threshold temperature, e.g., 100 degrees Fahrenheit, may be stored in the computer 38 and may be an upper operating threshold temperature for the one or more navigation sensors 24. To put it another way, operating the one or more navigation sensors 24 above the threshold temperature may damage the one or more navigation sensors 24. The threshold temperature may be greater than a lower threshold temperature and the same as an upper threshold temperature (discussed below). The computer 38 may determine whether a temperature of one or more of the navigation sensors 24 is above the threshold temperature based on data from the temperature sensors 88. The computer 38 may determine whether one or more of the fields of view FV are contaminated based on data from one or more of the navigation sensors 24, e.g., as described herein. Upon a determination that the temperature is above the threshold temperature and that one or more of the fields of view FV are contaminated the process 500 moves to a block 515. Upon a determination that the temperature is not above the threshold temperature or that the fields of view FV are not contaminated the process 500 moves to a block 520.

At the block 515 the computer 38 brings the vehicle 22 to a stop. For example, the computer 38 may operate vehicle 22 in the autonomous mode or the semi-autonomous to control the vehicle propulsion components 39, braking components 41, and steering components 43, e.g., by transmitting one or more instructions via the communication network 90, to stop the vehicle 22. Alternatively, the computer 38 may change modes, e.g., go from the autonomous mode or the semi-autonomous to the non-autonomous mode. Additionally, the computer 38 may actuate the diverter valve 26 to the first position and actuate the air compressor 86 to provide air to the diverter valve 26 to cool the one or more navigation sensors 24. For example, the computer 38 may transmit an instruction to the diverter valve 26 and the air compressor 86 via the communication network 90. The process 500 may remain at the block 515 until a temperature of the one or more navigation sensors 24 is below the threshold temperature of the block 510. After the block 515 the process 500 returns to the block 505. Alternately the process 500 may end.

At the block 520 the computer 38 determines whether one or more of the fields of view FV, e.g., one of the lenses 52 in the fields of view FV, are contaminated, e.g., based on data from one or more of the navigation sensors 24, e.g., as described herein. Upon a determination that one or more of the fields of view FV are contaminated the process 500 moves to a block 525. Upon a determination that the fields of view FV are not contaminated the process 500 moves to a block 530.

At the block 525 the computer 38 actuates the diverter valve 26 to the second position. For example, the computer 38 may transmit an instruction to the diverter valve 26 via the communication network 90 indicating such actuation. Further, the computer 38 may actuate the air compressor 86 to provide air to the diverter valve 26. Additionally or alternately, the computer 38 may actuate the washer fluid system 42 to provide fluid to the fluid nozzle 34. For example, the computer 38 may transmit an instruction to the air compressor 86 and/or the washer fluid system 42 via the communication network 90.

At the block 530 the computer 38 determines whether a temperature of one or more of the navigation sensors 24 is above a lower threshold temperature. The lower threshold temperature, e.g., 80 degrees Fahrenheit, may be stored in the computer 38 and may be such that the cooler 36 may provide sufficient cool air while the diverter valve 26 is in one of the third positions to maintain or reduce the temperature of the one or more navigation sensors 24 in a majority of situations. To put it another way, the cooler 36 may provide sufficient cool air while the diverter valve 26 is in one of the third positions to maintain or reduce the temperature of the one or more navigation sensors 24 when an ambient temperature outside the vehicle 22 is within a range of temperatures in which the vehicle 22 is typically operated. For example, the cooler 36 may provide sufficient cool air while the diverter valve 26 is in one of the third positions to maintain or reduce the temperature of the one or more navigation sensors 24 when the ambient temperature is at or below 80 degrees Fahrenheit, and may not provide sufficient cool air while the diverter valve 26 is in one of the third positions to maintain or reduce the temperature of the one or more navigation sensors 24 when the ambient temperature above 80 degrees Fahrenheit. To determine whether the temperature of one or more of the navigation sensors 24 is above the lower threshold temperature the computer 38 may compare a temperature detected by one or more of the temperature sensors 88 with the lower threshold temperature. Upon a determination that a temperature of one or more of the navigation sensors 24 is above the lower threshold temperature, the process 500 moves to the block 535. Upon a determination that a temperature of the navigation sensors 24 is not above the lower threshold temperature, the process 500 returns to the block 505. Alternately the process 500 may end.

At the block 535 the computer 38 actuates the diverter valve 26 to one of the third positions. For example, the computer 38 may transmit an instruction to the diverter valve 26 via the communication network 90. Further, the computer 38 may actuate the air compressor 86 to provide air to the diverter valve 26. For example, the computer 38 may transmit an instruction to the air compressor 86 via the communication network 90.

Next at a block 540 the computer 38 determines whether a temperature of one or more of the navigation sensors 24 is above the upper threshold temperature. The upper threshold temperature, e.g., 100 degrees Fahrenheit, may be stored in the computer 38 and may be the upper operating threshold temperature for the one or more navigation sensors 24, as described above for the threshold temperature at the block 510. The upper threshold temperature is higher than the lower threshold temperature. To determine whether the temperature of one or more of the navigation sensors 24 is above the upper threshold temperature the computer 38 may compare a temperature detected by one or more of the temperature sensors 88 with the upper threshold temperature. Upon a determination that a temperature of one or more of the navigation sensors 24 is above the upper threshold temperature, the process 500 moves to a block 545. Upon a determination that a temperature of the navigation sensors 24 is not above the upper threshold, the process 500 returns to the block 505. Alternately the process 500 may end.

At the block 545 the computer 38 actuates the diverter valve 26 to the first position. For example, the computer 38 may transmit an instruction to the diverter valve 26 via the communication network 90. After the block 545 the process 500 may end. Alternately the process 500 may return to the block 505.

With regard to the process described herein, it should be understood that, although the steps of such processes have been described as occurring according to a certain ordered sequence, such process could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance or order. Many modifications and variations of the present disclosure are possible in light of the above teachings, and the disclosure may be practiced otherwise than as specifically described.

What is claimed is:

1. An assembly comprising:
a housing defining a chamber;
a sensor in the chamber and defining a field of view;
a diverter valve having an input port for receiving air, a first output port, and a second output port;
a fluid nozzle in fluid communication with the first output port and facing the field of view outside the chamber; and
a cooler in fluid communication with the second output port, the cooler including a cold air exhaust in fluid communication with the chamber and a hot air exhaust free from being in fluid communication with the chamber.

2. The assembly of claim 1, further comprising an air compressor in fluid communication with the input port.

3. The assembly of claim 1, wherein the diverter valve is movable to a first position where fluid is inhibited from flowing from the input port to the first output port and permitted to flow from the input port to the second output port, and to a second position where fluid is inhibited from flowing from the input port to the second output port and permitted to flow from the input port to the first output port.

4. The assembly of claim 3, further comprising a processor and a memory storing program instructions executable by the processor to actuate the diverter valve to the second position in response to determining that the field of view is contaminated.

5. The assembly of claim 3, further comprising a processor and a memory storing program instructions executable by the processor to actuate the diverter valve to the first position in response to detecting that a temperature of the sensor is above a threshold.

6. The assembly of claim 3, wherein the diverter valve is movable to a third position where fluid is permitted to flow from the input port to the first output port and the second output port.

7. The assembly of claim 6, further comprising a processor and a memory storing program instructions executable by the processor to actuate the diverter valve to the third position in response to detecting that a temperature of the sensor is above a first threshold, and to actuate the diverter valve to the first position in response to detecting that the temperature of the sensor is above a second threshold that is higher than the first threshold.

8. The assembly of claim 1, further comprising a washer fluid system in fluid communication with the fluid nozzle.

9. The assembly of claim 8, further comprising a processor and a memory storing program instructions executable by the processor to actuate the washer fluid system to provide fluid to the fluid nozzle in response to determining that the field of view is contaminated.

10. The assembly of claim 8, further comprising a mixer valve having a first input port in fluid communication with the first output port of the diverter valve, a second input port in fluid communication with the washer fluid system, and an output port in fluid communication with the fluid nozzle.

11. The assembly of claim 10, further comprising a shutoff valve having a first port in fluid communication with the first output port of the diverter valve and a second port in fluid communication with the first input port of the mixer valve.

12. The assembly of claim 10, further comprising a shutoff valve having a first port in fluid communication with the washer fluid system and a second port in fluid communion with the second input port of the mixer valve.

13. The assembly of claim 8, wherein the washer fluid system includes a reservoir and a pump.

14. The assembly of claim 1, wherein the cooler is in the housing.

15. The assembly of claim 1, wherein the cooler includes a vortex tube.

16. The assembly of claim 1, further comprising a processor and a memory storing program instructions executable by the processor to control braking components of a vehicle to stop the vehicle in response to detecting that a temperature of the sensor is above a threshold and determining that the field of view is contaminated.

17. The assembly of claim 1, further comprising a lens in the field of view of the sensor, the fluid nozzle facing the lens.

18. The assembly of claim 17, further comprising a second lens and a second fluid nozzle in fluid communication with the first output port of the diverter valve and facing the second lens.

* * * * *